C. E. GRANDY.
Saw-Sets.
No. 137,607. Patented April 8, 1873.
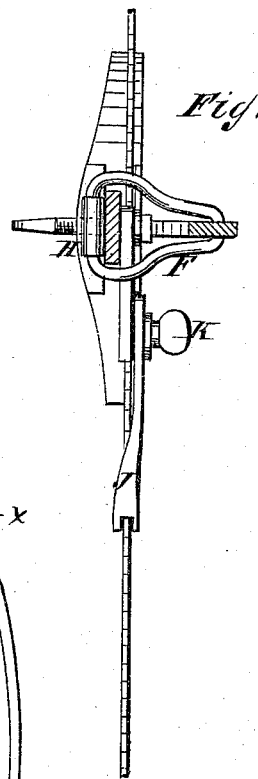
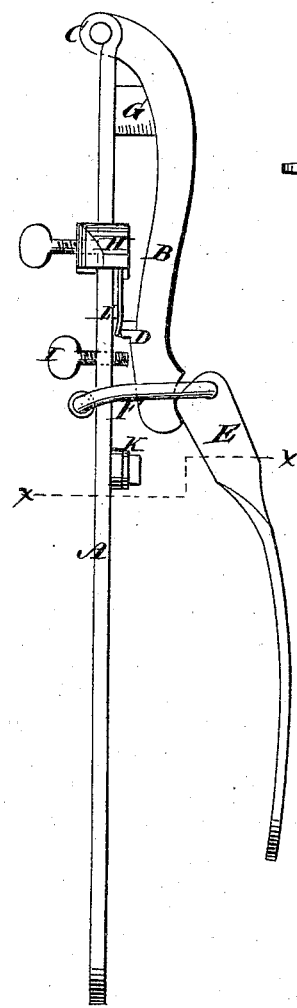
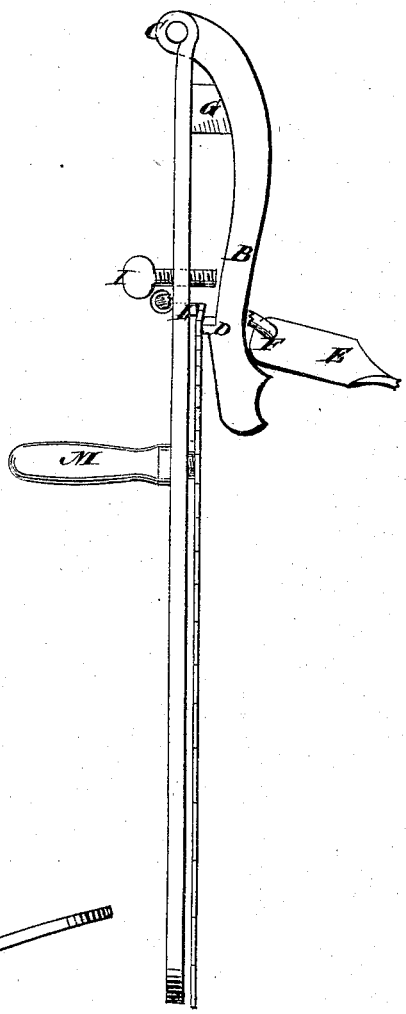
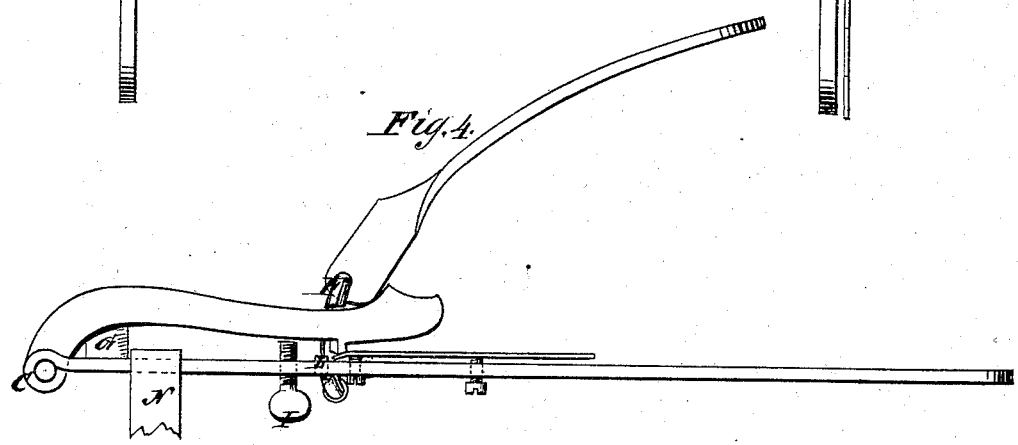

UNITED STATES PATENT OFFICE.

CYRUS E. GRANDY, OF STAFFORD SPRINGS, CONNECTICUT, ASSIGNOR TO HIMSELF, ZIBA B. GRANDY, AND WILLIAM D. HEALD, OF SAME PLACE.

IMPROVEMENT IN SAW-SETS.

Specification forming part of Letters Patent No. 137,607, dated April 8, 1873; application filed February 21, 1873.

*To all whom it may concern:*

Be it known that I, CYRUS E. GRANDY, of Stafford Springs, in the county of Tolland and State of Connecticut, have invented a new and useful Improvement in Saw-Sets, of which the following is a specification:

The invention consists in the mode of combining certain instrumentalities to form a saw-set for band-saws, as hereinafter described and pointed out in the claim.

In the accompanying drawing, Figure 1 represents the saw-set as applied to a band or jig saw and used in a horizontal position. Fig. 2 is another view of the same, showing the pawl which works in the teeth to regulate the movement of the set on the saw. Fig. 3 shows the saw-set as applied to a circular saw, the band-saw guide being removed and a handle introduced. Fig. 4 represents the saw-set as applied to a crosscut or hand saw, showing a side view.

Similar letters of reference indicate corresponding parts.

A is the stock or bar to which the parts of the saw-set are attached, and forming a handle and base of the instrument. B is the die-bar, which is hinged to the end of the stock A, as seen at C. D is the die on this bar. E is a cam-lever, by means of which the power is applied. The lever is confined to the end of the die-bar by means of the adjustable link F. The back motion of the die-bar is produced by spring G.

In this example of my invention a block of rubber is used, but any other suitable spring may be employed. The spring keeps the end of the die-bar in close contact with the cam-end of the lever, and the power is applied by simply raising the end or operating the lever. The purchase thus obtained is very great, and the power is gradually applied, which is a very desirable feature in a saw-set. The sudden bending of the tooth, as when struck with a hammer, is very liable to break it.

H is the guide, which slides on the stock so that it can be adjusted to the width of the saw. This guide is used in setting band and jig saws. I is the gage-screw. J is a loose adjustable pawl, attached by a screw, K, to the stock, which in setting band-saws engages with the teeth, and thereby governs the position of the teeth in relation to the dies. Allowing the teeth of the saw to be of uniform size a movement of the pawl to each alternate tooth will bring the proper tooth to be set in contact with the die. L is the bed-die, which is fast on the stock A.

In applying the set to a circular saw the band-saw guide H is removed, and the gage-screw is changed and a handle, M, is introduced, as seen in Fig. 3. The link is slipped upon the stock to make room for the saw, and the power is applied to the die-bar in a different place but in the same manner.

In setting crosscut or hand saws the machine is confined in a vise or to a bench by means of a clasp or lug attached to the stock, as seen at N, the arrangement being similar to that for circular saws. Band, circular, and jig saws are set with this instrument without detaching them, or as they hang for use, and in the most accurate, safe, and expeditious mannner.

As long as the essential features of this saw-set are preserved, the form and arrangement of parts may be varied without departing from my invention.

Having thus described my invention, I claim as new and desire to secure by Letters Patent—

The hinged and spring-retracted die-bar B D, the cam-lever E, link F, sliding guide H, and gage-screw I, combined and arranged in connection with stock-bar A, as described, to form a saw-set for band-saws.

CYRUS E. GRANDY.

Witnesses:
E. H. ALEXANDER,
E. R. FISK.